(12) United States Patent
Nakamura et al.

(10) Patent No.: US 7,733,044 B2
(45) Date of Patent: Jun. 8, 2010

(54) IPM MOTOR SYSTEM AND CONTROL METHOD THEREOF

(75) Inventors: Mitsugu Nakamura, Aichi (JP); Shinichi Isobe, Aichi (JP); Takao Sakurai, Aichi (JP); Takaya Shirasu, Kanagawa (JP)

(73) Assignee: Mitsubishi Heavy Industries, Ltd. (JP)

( * ) Notice: Subject to any disclaimer, the term of this patent is extended or adjusted under 35 U.S.C. 154(b) by 0 days.

(21) Appl. No.: 11/574,011

(22) PCT Filed: Feb. 23, 2006

(86) PCT No.: PCT/JP2006/003259

§ 371 (c)(1),
(2), (4) Date: Oct. 20, 2008

(87) PCT Pub. No.: WO2006/090774

PCT Pub. Date: Aug. 31, 2006

(65) Prior Publication Data

US 2009/0079370 A1    Mar. 26, 2009

(30) Foreign Application Priority Data

Feb. 24, 2005    (JP) .............................. 2005-049633

(51) Int. Cl.
*H02P 6/08*    (2006.01)
(52) U.S. Cl. .............................. 318/400.02; 318/400.39
(58) Field of Classification Search .................. 318/700, 318/400.01, 400.02, 400.11, 400.12, 400.32–400.41
See application file for complete search history.

(56) References Cited

U.S. PATENT DOCUMENTS

| 6,566,830 | B2 * | 5/2003 | Walters | 318/445 |
| 6,670,784 | B2 * | 12/2003 | Odachi et al. | 318/700 |
| 6,677,724 | B1 * | 1/2004 | Kim et al. | 318/700 |
| 7,276,877 | B2 * | 10/2007 | Qiu et al. | 318/721 |

FOREIGN PATENT DOCUMENTS

| JP | 5-146188 | 6/1993 |
| JP | 8054205 | 2/1996 |
| JP | 9-238495 | 9/1997 |
| JP | 10014299 | 1/1998 |
| JP | 2002010677 | 1/2002 |
| JP | 2002044910 | 2/2002 |
| JP | 2004-018190 | 1/2004 |
| JP | 2004072903 | 3/2004 |

* cited by examiner

*Primary Examiner*—Bentsu Ro
(74) *Attorney, Agent, or Firm*—Kanesaka Berner & Partners, LLP

(57) ABSTRACT

An IPM (Interior Permanent Magnet) motor system is provided with an IPM motor provided with a stator having slots and a rotor having poles, and a control unit which controls the rotor to the stator. An estimation precision of an initial angle position of the rotor to the stator is selected such that it is substantially the same as an angle unit precision of stable positions of the rotor to the stator which is based on a combination of the number of poles and the number of slots. In this way, the cheap IPM motor system with a high drive efficiency and a control method of the IPM motor system are provided.

14 Claims, 3 Drawing Sheets

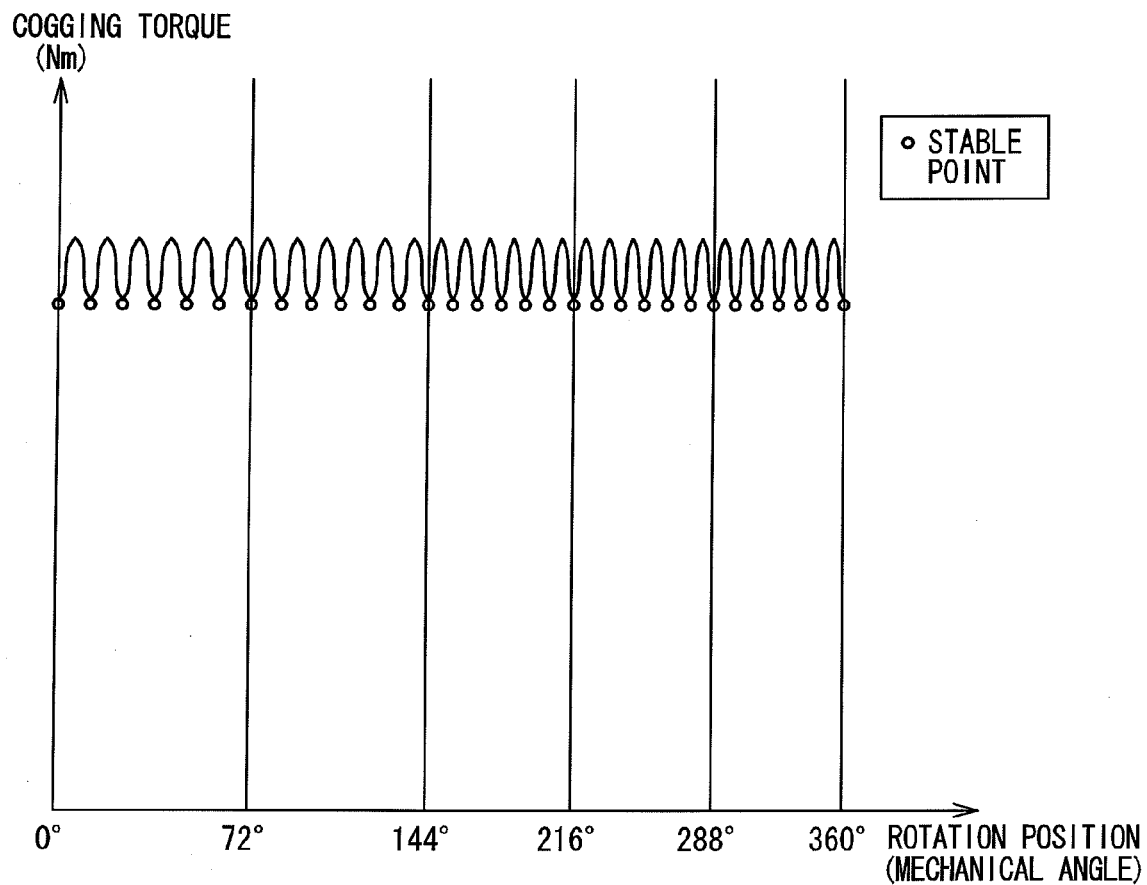

IPM MOTOR SYSTEM AND CONTROL METHOD THEREOF

RELATED APPLICATIONS

The present application is based on International Application No. PCT/JP2006/303259, filed Feb. 23, 2006, and claims priority from, Japanese Application No. 2005-049633, filed Feb. 24, 2005, the disclosure of which is hereby incorporated by reference herein in its entirety.

TECHNICAL FIELD

This invention is related to an IPM (Interior Permanent Magnet) motor system and a control method thereof.

BACKGROUND ART

An electric driving system of a hydraulic pressure pump and a wheel driver is developed, and AC motors are extensively used to accomplish higher efficiency than a DC motor. Of the AC motors, especially, an IPM motor has a high drive efficiency and also is excellent in responsibility. For this reason, the IPM motor has been extensively used in recent years. For control of the IPM motor, correct position data of a rotor is necessary, unlike the conventional DC motor and AC motor (induction motor).

The following position detecting devices are known as the conventional technique to obtain the position data of a rotor in a motor.

(a) Resolver and Encoder

The resolver to obtain position data and the encoder having a Z phase are expensive, and a kind of it is limited, and there is no fitting one depending on an axis diameter.

(b) Hall Element+Encoder Pulse to Obtain Position Data

Two sensing sections are necessary and input points for the Hall element increase.

(c) Low Resolution Pulse Encoder+Speed Estimation

Algorithm for estimating speed is incorporated to compensate the low resolution of the low resolution pulse encoder. Therefore, a calculation amount increases and practical use is difficult.

(d) Sensorless Control

A calculation amount is more, and practical use is difficult in point of responsibility and reliability.

A rotor position detection error by the position detecting device causes a torque error in the motor. As factors due to which the rotor position detection error is caused, there are:

(1) estimation error of a rotor initial position, (2) lack of a pulse resolution, (3) delay of detection in hardware and delay of speed calculation in software, and so on.

In a conventional induction motor, an encoder and a bearing sensor were mainly used to acquire speed data. On the other hand, in the IPM motor, a resolver is mainly used to acquire correct position data but the resolver is expensive.

Therefore, it is demanded to realize AC motors such as the IPM motor in which the position control of the rotor can be carried out in a high precision while using a cheaper position detecting device, in order to realize an electric driving system of a hydraulic pressure pump and a wheel driver cheaply in high efficiency.

In conjunction with the above description, "Speed Control Device of Motor" is disclosed in Japanese Laid Open Patent Application (JP-A-Heisei 5-146188). In the first conventional speed control device of a motor, a speed detector sends out the detected speed of the motor as a pulse output. A speed estimation observer converts a load torque estimation observer of minimum dimension into a discrete model in a speed control period and a speed detection period and estimates speed in an interval between pulses outputted from the speed detector. Especially, in the speed estimation observer, a first calculating section calculates a model output estimation value by integrating a difference between a torque command and a load torque estimation value with respect to an observer model mechanical time constant. A second calculating section calculates an average of the model output estimation values outputted from the first calculating section in a pulse interval. A first difference section calculates deference between the output of the second calculating section and an average speed from a speed detector which is determined in case of the pulse change. An observer gain section calculates a load torque estimation value by multiplying the difference obtained by the first difference section by an observer gain. A second difference section calculates a difference between the model output estimation value from the first calculating section and the difference from the first difference section. A third difference section calculates a difference between the speed estimation value from the second difference section and a speed setting value. The difference calculated by the third difference section is supplied to a speed amplifier, and an adding section adds the output of the speed amplifier and the load torque estimation value of the observer gain section to acquire a torque command. In the speed control apparatus for a motor, a predicted velocity calculating section calculates a prediction speed for every speed control period until an output pulse is supplied from the speed detector. A comparator is supplied with the prediction speed calculated by the calculating section and the speed estimation value calculated by the second difference section. When the speed estimation value outputted from the second difference section is larger than the predicted speed, an ON output is sent out and when the predicted speed is equal to or larger than the speed estimation value, an OFF output is sent out. When the comparator outputs the ON output, a switch supplies the predicted speed to the third difference section, and when the comparator sends out the OFF output, the switch supplies the speed estimation value to the third difference section.

Also, "Rotation Position Detecting Apparatus of Rotation Machinery" is disclosed in the Japanese Laid Open Patent Application (JP-A-Heisei 8-54205). In the rotation position detecting apparatus of the rotation machine of this conventional example, a circular board is formed so as to repeat in a circumferential direction, one state for 180° and another state different from one state in electric angle alternately. The circular board is fixed to a rotation axis of the rotation machine. Three sensors are respectively arranged in positions which are distanced by 120° from each other in the mechanical angle in the circumferential direction. Thus, the one state and the other state are detected in accompany with the rotation of the circular board and a binary signal corresponding to the detected state is outputted from each of the sensors. The rotary encoder has the circular board coupled to this rotation axis to generate pulses for a number corresponding to the rotation angle when an interval between absolute positions is subdivided, and data indicative of a rotation direction of the rotation axis, and the sensor arranged closely to the circular board. The calculating section detects an absolute position of the rotation axis in units of 60° in the electric angle by a combination of the binary signals from the three sensors. Then, the calculating section processes the signal indicating this absolute position and the signal indicating a relative position between adjacent absolute positions which is an output signal of the sensor of the rotary encoder and calculates the rotation position of the rotation axis.

Also, "Rotation Detection Mechanism of Motor" is disclosed in Japanese Laid Open Patent application (JP-P2002-44910A). In this conventional example, the rotation detection mechanism is provided with a bearing sensor in which a sensor section for detecting the number of rotations of a motor and a bearing section for supporting a motor axis are integrated. The bearing sensor is mounted in the end cover of the motor with a plate member. The bearing section is engaged to a first concave section formed in the end cover of the motor and protrudes from the end cover inside. A second concave section is formed to be engaged with the angle of the bearing section which is prominent.

Also, "Electric Angle Detecting Apparatus and Driving Apparatus of Synchronous Motor" is disclosed in Japanese Laid Open Patent application (JP-A-Heisei 9-238495). In this conventional example, the electric angle detecting apparatus for the synchronous motor, multi-phase current flows through windings and a rotor is rotated through interaction of the magnetic field by the windings and magnetic field of permanent magnets. A storage section previously stores a relation between the electric angle and current flowing through each of the multi-phase windings in accordance with a voltage when the voltage is applied for a combination of currents flowing through the multi-phase windings. A voltage applying section applies the voltage for the combination, and a detecting section detects each of the currents flowing through the multi-phase windings when the voltage is applied by the voltage applying section. An electric angle calculating section refers to the relation stored in the storage section based on the currents of the windings detected by the detecting section to determine an electric angle of the motor between 0° to 2π.

Also, "Lift Height Detecting Apparatus and Lift Track With the Same" is disclosed in Japanese Laid Open Patent Application (JP-P2004-018190A). In the lift height detecting apparatus of this conventional example, a rotation detecting section detects the number of rotations of rotatable up-and-down guidance roller provided for an up-and-down body. A movement quantity calculating section an up-and-down movement quantity of the up-and-down body through calculation based on the number of rotations of the up-and-down guidance roller. A lift height calculating section calculates a current height of the up-and-down body by summing the up-and-down movement quantity.

DISCLOSURE OF INVENTION

An object of the present invention is to provide an IPM (Interior Permanent Magnet) motor system which is cheap and has a high drive efficiency and a control method of an IPM motor.

In an aspect of the present invention, an IPM (Interior Permanent Magnet) motor system includes an IPM motor provided with a stator with slots and a rotor with poles; and a control unit configured to control the IPM motor. An angle estimation read precision of an initial position of the rotor to the stator by the control unit and an angle unit precision of stable positions of the rotor to the stator determined based on a combination of a number of the slots and a number of the poles are substantially equal to each other.

Here, the number of slots in the stator is m (m is a positive integer more than 2), the number of poles in the rotor is n (n is a positive integer more than 1 and smaller than m), and a unit angle of the stable positions is 360/(2 m). Preferably, the stator has 15 slots, and the rotor has 10 poles.

The IPM motor system may further include a bearing sensor provided for a rotation axis which is connected with the rotor, to detect a movement quantity from the initial position of the rotor to the stator.

Also, the control unit may include a calculating section configured to output a number of rotations of the IPM motor and a measured phase angle from an output from the bearing sensor; a current command generating section configured to generate a d-axis current command and a q-axis current command based on the number of rotations and a torque command; a measuring section configured to generate a measured d-axis current and a measured q-current from a 3-phase motor current of the IPM motor; a voltage command generating section configured to generate a 2-phase voltage command from the d-axis current command, the q-axis current command, the measured d-axis current and the measured q-current; a command converting section configured to generate a 3-phase voltage command from a post-correction phase angle and the 2-phase voltage command; a driving section configured to drive the IPM motor based on the 3-phase voltage command; and a correcting section configured to generate the post-correction phase angle from the measured phase angle, the d-axis current command, the q-axis current command, the measured d-axis current and the measured q-axis current.

The correcting section calculates a correction value from the d-axis current command, the q-axis current command, the measured d-axis current and the measured q-current and generates the post-correction phase angle from the correction value and the measured phase angle. Especially, the correcting section calculates the correction value $\Delta\theta$ from the following equation:

$$\Delta\theta = k\Sigma(i_d{}^* - i_{d\_fb})$$

where k is a gain, $i_d{}^*$ is the d-axis current command, and $i_{d\_fb}$ is the measured d-axis current value.

The value of the k is determined based on a torque load of the IPM motor. The k value is set to a smaller value as the torque load increases. The k value is set to a smaller value when the rotor is in a low-speed rotation, and to a larger value when the rotor is in a high-speed rotation.

In another aspect of the present invention, a control method of an IPM (Interior Permanent Magnet) motor system, is achieved by providing an IPM motor provided with a stator having slots and a rotor having poles and a control unit configured to control the IPM motor; and by controlling the IPM motor by the control unit in a condition that an angle estimation read precision of an initial position of the rotor to the stator and an angle unit precision of stable positions of the rotor to the stator determined based on a combination of a number of the poles and a number of the slots are substantially equal to each other.

Here, the number of the slots in the stator is m (m is a positive integer more than 2), the number of the poles in the rotor is n (n is a positive integer more than 1 and smaller than m), and a unit angle of the stable positions is 360/(2 m). Preferably, the stator has 15 slots, and the rotor has 10 poles.

The control method may be achieved by further detecting a movement quantity from the initial position of the rotor to the stator by a bearing sensor provided for a rotation axis which is connected with the rotor.

Also, the controlling may be achieved by outputting a number of rotations of the IPM motor and a measured phase angle from an output from the bearing sensor; by generating a d-axis current command and a q-axis current command based on the number of rotations and a torque command; by generating a measured d-axis current and a measured q-current from a 3-phase motor current of the IPM motor; by generating a 2-phase voltage command from the d-axis current command, the q-axis current command, the measured d-axis current and the measured q-current; by generating a 3-phase voltage command from a post-correction phase angle and the 2-phase voltage command; by driving the IPM motor based on the 3-phase voltage command; and by generating the post-correction phase angle from the measured phase angle, the d-axis current command, the q-axis current command, the measured d-axis current and the measured q-axis current.

Also, the generating the post-correction phase angle may be achieved by calculating a correction value from the d-axis current command, the q-axis current command, the measured d-axis current and the measured q-current; and by generating the post-correction phase angle from the correction value and the measured phase angle.

The generating the post-correction phase angle may be achieved by calculating the correction value $\Delta\theta$ from the following equation:

$$\Delta\theta = k\Sigma(i_d^* - i_{d\_fb})$$

where k is a gain, $i_d^*$ is the d-axis current command, and $i_{d\_fb}$ is the measured d-axis current value.

Also, the generating the post-correction phase angle may be achieved by determining a value of the k based on a torque load of the IPM motor. In this case, the k value is set to a smaller value as the torque load increases. The k value is set to a smaller value when the rotor is in a low-speed rotation, and to a larger value when the rotor is in a high-speed rotation.

BRIEF DESCRIPTION OF DRAWINGS

FIG. 3 is a diagram showing the stable points of a rotor of the IPM motor according to the embodiment of the present invention.

BEST MODE FOR CARRYING OUT THE INVENTION

Hereinafter, an IPM motor system according to the present invention will be described in detail with reference to the attached drawings.

The IPM motor system of the present invention is composed of an IPM motor of a stator having slots and a rotor having poles, and a motor control system which drives and controls the rotor to the stator. A cheap bearing sensor is used for the detection of an angle position of the rotor. An estimation precision of an initial angle position of the rotor to the stator is selected to be equal to an angle unit precision of a stable position of the rotor to the stator which causes based on a combination of the number of poles and the number of slots. By this, the motor control system acquires angle position data of the rotor in a high precision and can carry out the position control of the rotor. Moreover, when an external torque is loaded to the rotor, a correction value of the angle position of the rotor based on the magnitude of the external torque is calculated and determined by the motor control system and the angle position of the rotor is corrected based on this correction value. Thus, the IPM motor system of the high efficiency can be cheaply realized.

Figure 1:
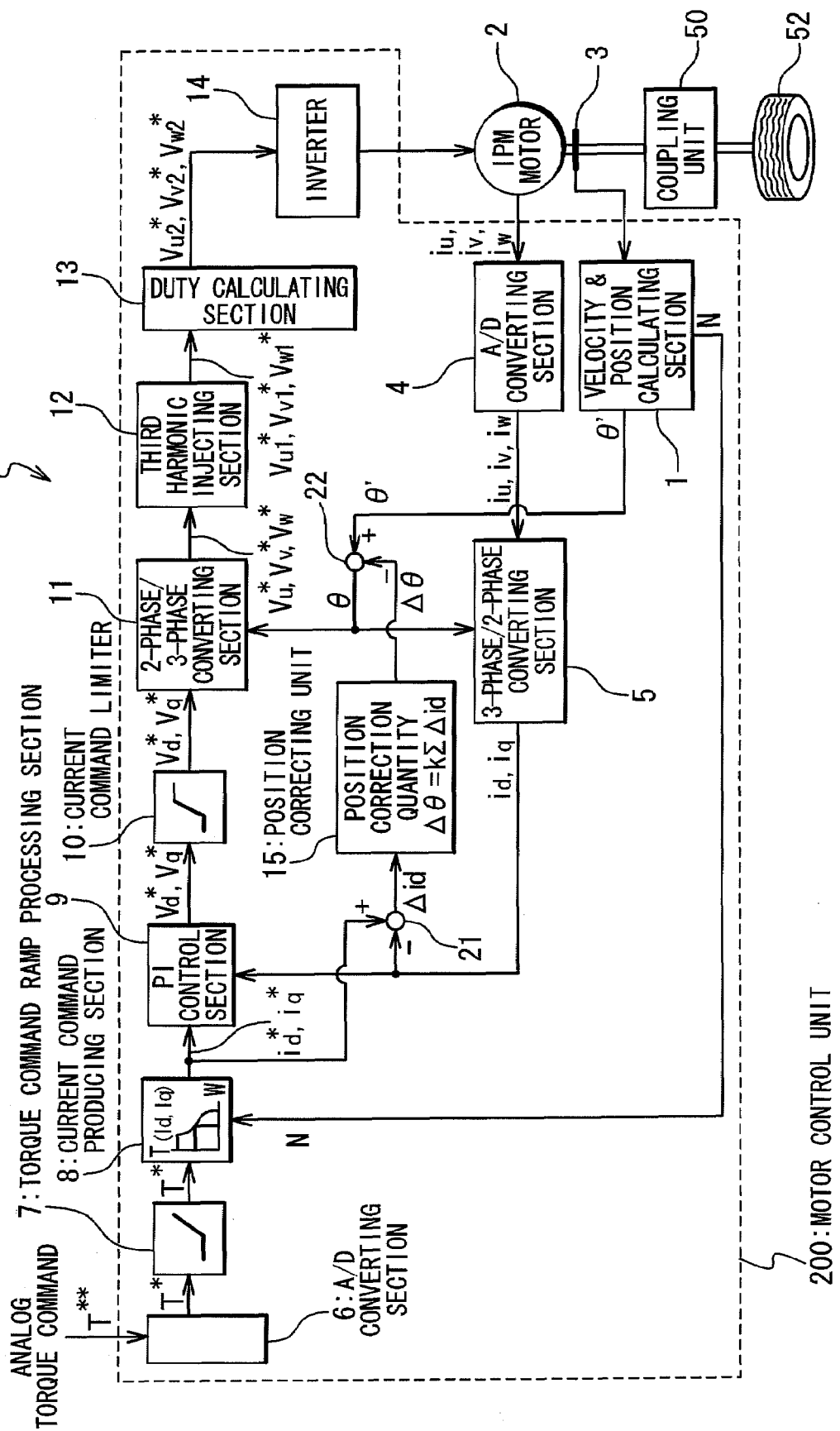
FIG. 1 is a diagram showing the configuration of an IPM motor system according to an embodiment of the present invention.

FIG. 1 is a block diagram showing the configuration of a three-phase IPM motor system according to the embodiment of the present invention. Referring to FIG. 1, the IPM motor system 100 in this embodiment is composed of an IPM motor 2, a motor control unit 200 to control the IPM motor 2, a bearing sensor 3 provided for the rotation axis of the IPM motor 2, and wheels (one of them is not shown) 52 connected to the rotation axis of the IPM motor 2 through a coupling unit 50. The coupling unit 50 may be provided with a gear provided for a shaft and a gear provided for the rotation axis of the motor, when the wheel 52 is coupled to the shaft. Also, the coupling unit 50 may be a transmission. Also, in the above, the wheels 52 are coupled with both ends of the shaft. However, the IPM motor 2 may be provided for every wheel 52. In this case, the coupling unit 52 may be omitted and the rotation axis of the IPM motor 2 may be coupled in direct with the wheel 52.

The IPM motor 2 is provided with the bearing sensor 3. The bearing sensor 3 is provided between the IPM motor 2 and the coupling unit 50 driven by the IPM motor 2. A movement quantity of the rotor 103 of the IPM motor 2 from an initial position is detected by the bearing sensor 3. The motor control unit 200 is composed of a velocity & position calculating section 1, an analog to digital converting section 4, a 3-phase/2-phase converting section 5, an analog-to-digital converting section 6, a torque command ramp processing section 7, a current command producing section 8, a PI control section 9, a voltage command limiter 10, a 2-phase/3-phase converting section 11, a third harmonic injecting section 12, a duty calculating section 13 and an inverter 14.

Figure 2:
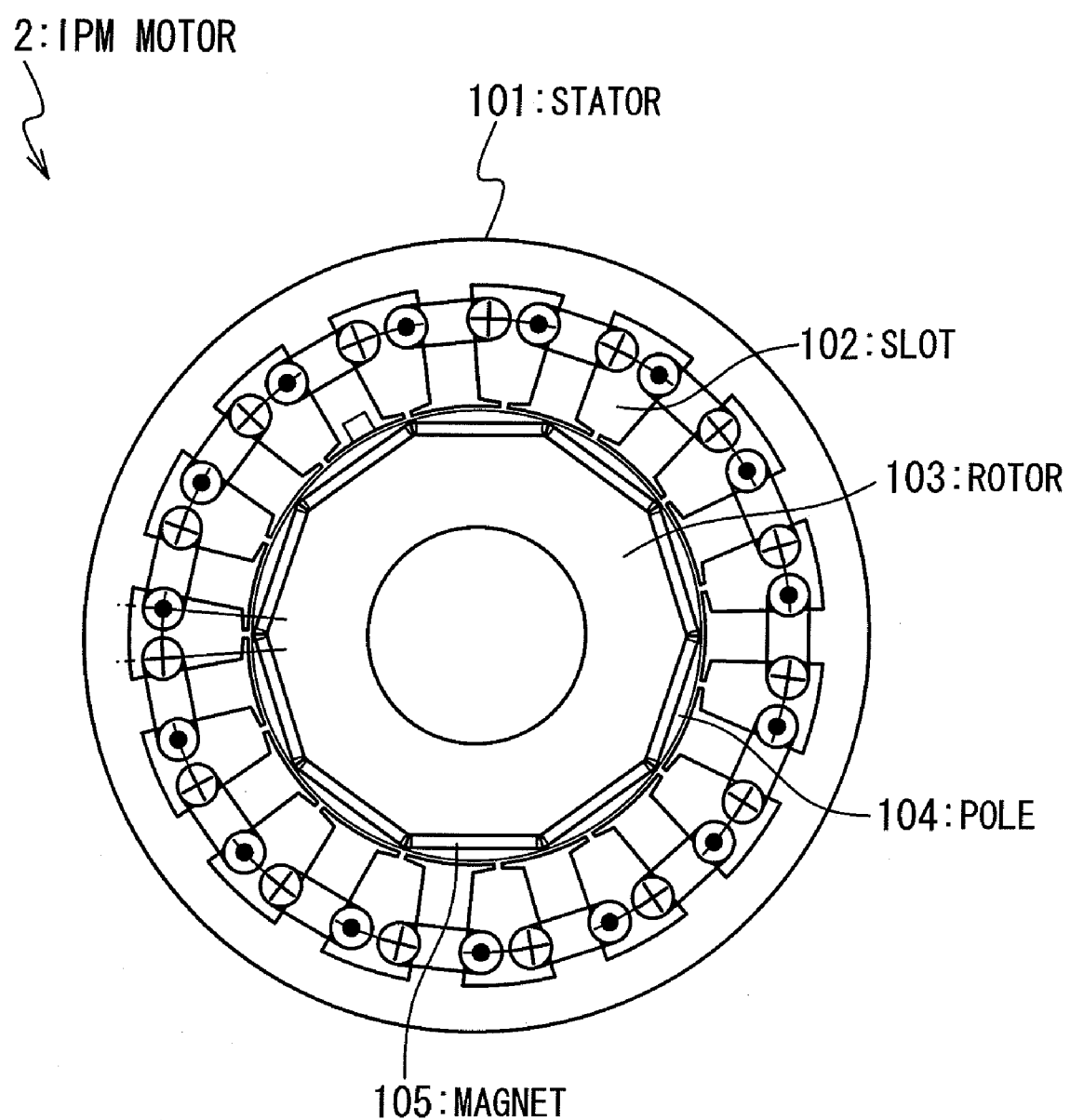
FIG. 2 is a diagram showing the section of the IPM motor which is used in the embodiment of the present invention.

Next, the IPM motor used in this embodiment of the present invention will be described. FIG. 2 is a sectional view showing the IPM motor 2 in this embodiment. As shown in FIG. 2, the IPM motor 2 is provided with a stator 101 having 15 slots 102 and a rotor 103 having 10 poles 104. A magnet 105 is embedded in the rotor 103 corresponding to each pole 104. Stable points where the IPM motor is settled stably are generated in position relation of the stator 101 and the rotor 103 through a combination of 15 slots 102 and 10 poles 104.

FIG. 3 is a diagram showing in mechanical angle, the stable points including quasi-stable points of an optional point of the rotor 103 to an optional point of the stator 101 in this embodiment. In the IPM motor 2 of this embodiment, a relatively large cogging torque is generated from the combination of the number of slots 102 of the stator 101 and the number of poles 104 of the rotor 103. A plurality of stable points of the rotor 103 are determined as shown in FIG. 3. The stable points exist for the number of slots while the rotor 103 is rotated once. In this embodiment, 15 stable points exist for every 24°(=360°/15). Also, when the pole 104 is located on the middle point exactly so that the pole 104 is pulled to the directions of the slots 102 at a same time, the rotor 103 stays in the point as the quasi-stable point. In this embodiment, as the middle spots of adjacent two of the slots 102, 15 quasi-stable points exist. As a result, in the IPM motor 2 of this embodiment, 30 stable points which include the quasi-stable points exist for every about 12° in mechanical angle.

In the IPM motor system 100 of this embodiment, initial position estimation algorithm is provided to estimate an angle position of the rotor 103 in electric angle in units of 60° (in units of 12° in mechanical angle). In this way, in the IPM motor system of the present invention, the rotation angle data of the rotor 103 in units of 12° which is based on the stable points in units of 12° can be estimated in a high precision. By feeding back the rotation angle data of the rotor 103 into the motor control unit 200, the drive efficiency of the IPM motor system 100 of this embodiment can be improved.

A torque control in the IPM motor 2 will be described with reference to FIG. 1. The motor control unit 200 is applied to the control of a 3-phase IPM motor in the present embodiment but it is possible to apply it to the control of the other motor (4-phase or more phase IPM motor, multi-phase induction motor, multi-phase synchronous reluctance motor and so on).

In FIG. 1, the velocity & position calculating section 1 calculates the number of rotations N of the IPM motor 2 and current phase (rotation position) θ' based on an AB phase pulse signal of IPM motor 2 or the output of the bearing sensor 3. The analog to digital converting section 4 carries out A/D conversion on the currents iu, iv, and iw which flow through the IPM motor 2 and outputs the conversion result to the 3-phase/2-phase converting section 5. The 3-phase/2-phase converting section 5 converts the 3-phase motor currents iu, iv, and iw into 2-phase currents $i_d$ and $i_q$ based on a post-correction angle position value θ of IPM motor 2, and the well-known 3-phase/2-phase conversion equation. In other words, the conversion into the d axis current $i_d$ and the q axis current $i_q$ for the vector control is carried out.

In this motor control unit 200, an analog torque command T** is converted into a digital torque command T* by the analog-to-digital converting section 6. The torque command ramp processing section 7 processes this digital torque command T* based on a ramp function and outputs a digital torque command T* after the ramp processing to the current command producing section 8. The current command producing section 8 sets current commands $i_d^*$ and $i_q^*$ based on a given digital torque command T* and the number of rotations N such that a total loss of the motor 2 is minimized.

The PI control section 9 carries out a PI (proportion and integration) process on differences between the d axis current command $i_d^*$ and the q axis current command $i_q^*$ which are outputted from the current command producing section 8 and the actual d axis current $i_d$ and actual q axis current $i_q$ from the IPM motor 2 which are outputted from the 3-phase/2-phase converting section 5 and outputs voltage commands $V_d^*$ and $V_q^*$ corresponding to the differences. The voltage commands $V_d^*$ and $V_q^*$ which are outputted from the PI control section 9 are supplied to the 2-phases/3-phase converting section 11 through the voltage command limiter 10.

The 2-phases/3-phase converting section 11 converts the above voltage commands $V_d^*$ and $V_q^*$ into 3-phase voltage commands $V_u^*$, $V_v^*$, and $V_w^*$ based on the post-correction current phase θ of IPM motor 2, and the well-known 2-phase/3-phase conversion equation. A third harmonic signal is injected into the third harmonic injecting section 12 to the voltage commands $V_u^*$, $V_v^*$, and $V_w^*$ which are outputted from the 2-phases/3-phase converting section 11 to produce 3-phase voltage commands $V_{u1}^*$, $V_{v1}^*$, and $V_{w1}^*$. The duty calculating section 13 sets a duty ratio for the PWM control based on the 3-phase voltage commands $V_{u1}^*$, $V_{v1}^*$, and $V_{w1}^*$ to generate 3-phase voltage commands $V_{u2}^*$, $V_{v2}^*$, and $V_{w2}^*$ and then outputs the 3-phase voltage commands $V_{u2}^*$, $V_{v2}^*$, and $V_{w2}^*$ to the inverter 14. The inverter 14 converts DC output power from a battery (not shown) into power components corresponding to the 3-phase voltage commands $V_{u2}^*$, $V_{v2}^*$, and $V_{w2}^*$ and drives the IPM motor 2 based on the power components. In this way, the IPM motor 2 is driven by the motor control unit 200 in the embodiment to generate a torque corresponding to the above digital torque command T*.

Moreover, the motor control unit 200 in the present embodiment is provided with a position correcting section. The position correcting section eliminates an error of an angle position of the rotor of the IPM motor 2 due to an external torque imposed on the IPM motor 2 to zero. For this purpose, the position correcting section calculates and outputs a position correction value (electric angle) which is equivalent to the error of the angle position of the rotor of the IPM motor 2 in case of the external torque load. The position correcting section is provided with the adders 21 and 22 and the position correcting unit 15.

The adder 21 calculates a difference $\Delta i_d$ between the d and q axes current commands $i_d^*$, and $i_q^*$ outputted from the current command producing section 8 and the actual currents $i_d$ and $i_q$ of the IPM motor 2 outputted from the 3-phase/2-phase converting section 5. The position correcting unit 15 calculates and determines a position correction value (electric angle) Δθ which is equivalent to the initial position estimation error of the rotor of the IPM motor 2 in case of the torque load, from the difference $\Delta i_d$ by using the following equation:

$$\Delta\theta = k\Sigma(i_d^* - i_{d\_fb})$$

where Δθ is a correction value [°], k is a gain, $i_d^*$ is a d axis current command, $i_{d\_fb}$ is an actual d axis current value fed back from the converting section 5.

The position correcting unit 15 determines the position correction value Δθ from the above equation and outputs the value to the adder 22. The adder 22 calculates a post-correction angle position value θ which is a summation of the position correction value Δθ and a current phase (rotation position) θ' signal of the IPM motor 2 outputted from the velocity & position calculating section 1, and supplies the calculation result to the 2-phases/3-phase converting section 11 and the 3-phase/2-phase converting section 5.

The value of k (gain) is determined to set an angle position error to zero in accordance with the magnitude of the external torque being imposed on the IPM motor 2. When the external torque increases, the value of k is set to a gradually smaller value. Also, in case of low-speed rotation of the rotor, a degree of the weakening magnetic field to the permanent magnet embedded in the IPM motor 2 is small and influence of the angle position error on the torque error is small. Therefore, the value of k is set to a smaller value. On the other hand, in case of high-speed rotation of the rotor, the degree of the weakening magnetic field to the permanent magnet embedded in the IPM motor 2 is large and the influence of the angle position error on the torque error is large. Therefore, the value of k is set to a relatively more value than in the low-speed rotation. Thus, the angle position error of the rotor is corrected when the external torque is imposed on the IPM motor 2, and the IPM motor 2 is driven to generate the torque corresponding to the digital torque command T* purely.

The IPM motor system 100 in the present embodiment includes the IPM motor 2 having the stator 101 provided with the slots 102, and the rotor 103 provided with poles 104, and the motor control unit 200. The combination of the number of poles 104 and the number of slots 102 is selected such that the angle estimation precision of the initial position of the rotor 103 to the stator 101 and the angle unit precision of the stable positions of the rotor 103 to the stator 101 which is determined based on the combination of the number of poles 104 and the numbers of slots 102 are approximately equal to each other.

In this embodiment, it becomes possible to control the IPM motor efficiently from the low-speed rotation to the high-speed rotation by using the cheap bearing sensor and the estimation algorithm rotor of the initial angle position which was conventional known. Also, thus, these parts are common to the induction motors and the reduction of production cost can be realized.

The IPM motor system 100 of the present invention is applied to a battery type forklift which is provided with a running motor. By applying the IPM motor system 100 of the present embodiment to the running motor, the cheap system can control the operations from the low-speed large torque operation to the high-speed rotation operation efficiently. Thus, the battery type forklift provided with the compact drive section for the running can be realized. Also, the IPM motor system of the present invention can be applied to the loading motor. In this case, the wheels 52 in FIG. 1 are omitted. In this example, the battery type forklift provided with a compact loading section can be realized.

Also, the IPM motor system 100 of this embodiment of the present invention can be applied to an electric car with a running motor. In this example, the electric car with a compact drive section can be realized. Also, it can be applied to a hybrid type electric car, in the same way.

Also, the IPM motor system 100 of this embodiment of the present invention can be applied to an elevator with an up-and-down movement motor. In this example, the elevator with a compact drive section can be realized.

Moreover, the IPM motor system 100 of the embodiment of the present invention can be applied to a vehicle with the running motor for railway. The vehicle with the running motor for railway having a compact drive section can be realized.

As described above, according to the present invention, the IPM (Interior Permanent Magnet) motor system with a high efficiency and a cheap price and a control method of the IPM motor can be provided.

The invention claimed is:

1. An IPM (Interior Permanent Magnet) motor system comprising:
    an IPM motor comprising a stator having slots and a rotor having poles;
    a control unit configured to control said IPM motor, said control unit estimates an initial position of said rotor to said stator in an angle estimation read precision, and said angle estimation read precision is equal to an angle unit precision of 360°/2 m, where m is the number of said slots in said stator; and
    a bearing sensor provided for a rotation axis which is connected with said rotor to detect a movement quantity from said initial position of said rotor to said stator;
    wherein said control unit comprises:
    a calculating section configured to output a number of rotations of said IPM motor and a measured phase angle from an output from said bearing sensor;
    a current command generating section configured to generate a d-axis current command and a q-axis current command based on the number of rotations and a torque command;
    a measuring section configured to generate a measured d-axis current and a measured q-axis current from a 3-phase motor current of said IPM motor;
    a voltage command generating section configured to generate a 2-phase voltage command from said d-axis current command, said q-axis current command, said measured d-axis current and said measured q-axis current;
    a command converting section configured to generate a 3-phase voltage command from a post correction phase angle and said 2-phase voltage command;
    a driving section configured to drive said IPM motor based on said 3-voltage command; and
    a correcting section configured to generate said post-correction phase angle from said measured phase angle, said d-axis current command, said q-axis current command, said measured d-axis current and said measured q-axis current.

2. The IPM motor system according to claim 1, wherein a set of the number of said slots and the number of said poles is a set of fifteen slots and ten poles or a set of twelve slots and eight poles.

3. The IPM motor system according to claim 1, wherein said correcting section calculates a correction value from said d-axis current command, said q-axis current command, said measured d-axis current and said measured q-axis current and generates said post-correction phase angle from said correction value and said measured phase angle.

4. The IPM motor system according to claim 3, wherein said correcting section calculates said correction value $\Delta\theta$ from the following equation:

$$\Delta\theta = k\Sigma(i_d^* - I_{d\_fb})$$

where k is a gain, $i_d^*$ is said d-axis current command, and $i_{d\_fb}$ is said measured d-axis current value.

5. The IPM motor system according to claim 4, wherein a value of said k is determined based on a torque load of said IPM motor.

6. The IPM motor system according to claim 5, wherein said k value is set to a smaller value as said torque load increases.

7. The IPM motor system according to claim 6 wherein said k value is set to a smaller value when said rotor is in a low-speed rotation, and to a larger value when said rotor is in a high-speed rotation.

8. A control method of an IPM (Interior Permanent Magnet) motor system, comprising:
    providing an IPM motor having a stator with slots and a rotor with poles and a control unit configured to control said IPM motor;
    estimating an initial position of said rotor to said stator in an angle estimation read precision by said control unit, said angle estimation read precision is equal to an angle unit precision of 360°/2 m, where m is the number of said slots in said stator; and
    detecting a movement quantity from said initial position of said rotor to said stator by a bearing sensor provided for a rotation axis which is connected with said rotor;
    wherein said estimating an initial position comprises:
    outputting a number of rotations of said IPM motor and a measured phase angle from an output from said bearing sensor;
    generating a d-axis current command and a q-axis current command based on the number of rotations and a torque command;
    generating a measured d-axis current and a measured q-axis current from a 3-phase motor current of said IPM motor;
    generating a 2-phase voltage command from said d-axis current command, said q-axis current command, said measured d-axis current and said measured q-axis current,
    generating a 3-phase voltage command from a post-correction phase angle and said 2-phase voltage command;
    driving said IPM motor based on said 3-phase voltage command; and generating said post-correction phase angle from said measured phase angle, said d-axis current command, said q-axis current command said measured d-axis current and said measured q-axis current.

9. The IPM motor system according to claim 8, wherein a set of the number of said slots and the number of said poles is a set of fifteen slots and ten poles or a set of twelve slots and eight poles.

10. The control method according to claim 8, wherein said generating said post-correction phase angle comprises:
calculating a correction value from said d-axis current command, said q-axis current command, said measured d-axis current and said measured q-axis current; and
generating said post-correction phase angle from said correction value and said measured phase angle.

11. The control method according to claim 10, wherein said generating said post-correction phase angle comprises:
calculating said correction value $\Delta\theta$ from the following equation:

$$\Delta\theta = k\Sigma(i_d{}^* - i_{d\_fb})$$

where k is a gain, $i_d{}^*$ is said d-axis current command, and $i_{d\_fb}$ is said measured d-axis current value.

12. The control method according to claim 11, wherein said generating said post-correction phase angle comprises:
determining a value of said k based on a torque load of said IPM motor.

13. The control method according to claim 12, wherein said k value is set to a smaller value as said torque load increases.

14. The control method according to claim 13, wherein said k value is set to a smaller value when said rotor is in a low-speed rotation, and to a larger value when said rotor is in a high-speed rotation.

* * * * *